United States Patent
Taylor

[11] 3,906,146
[45] Sept. 16, 1975

[54] MODULAR WIRING DUCT AND WIRE HOLDER SYSTEM

[75] Inventor: Philip W. Taylor, Howell, Mich.

[73] Assignee: Taylor Industries, Inc., Howell, Mich.

[22] Filed: Feb. 6, 1974

[21] Appl. No.: 440,146

[52] U.S. Cl. .............. 174/72 A; 24/73 P; 174/101; 174/138 D; 211/13; 211/87; 248/68 R; 317/122
[51] Int. Cl.² .... H02G 3/02; F16L 3/00; A47F 7/00
[58] Field of Search ...... 174/68 C, 72 A, 72 C, 101, 174/138 D, 164, 166 S; 179/98; 317/117, 122; 24/73 P; 211/13, 57, 59, 60 R, 60 T, 87, 89, 124; 248/49, 68 R, DIG. 3

[56] References Cited
UNITED STATES PATENTS

| | | | |
|---|---|---|---|
| 2,128,606 | 8/1938 | DeVoss, Jr. | 211/89 |
| 2,233,107 | 2/1941 | Miller | 179/98 |
| 2,526,766 | 10/1950 | Ornell | 211/89 |
| 2,940,016 | 6/1960 | Flint et al. | 174/166 S UX |
| 3,024,301 | 3/1962 | Walch | 174/72 A |
| 3,126,185 | 3/1964 | Christman | 174/164 X |
| 3,229,029 | 1/1966 | Weiss | 174/72 A X |
| 3,297,168 | 1/1967 | Fleming | 211/89 |
| 3,363,050 | 1/1968 | Martin | 174/72 A X |
| 3,573,373 | 4/1971 | Mullin et al. | 317/122 X |
| 3,752,198 | 8/1973 | Fiorentino et al. | 317/117 X |

FOREIGN PATENTS OR APPLICATIONS

| | | | |
|---|---|---|---|
| 509,697 | 8/1920 | France | 248/DIG. 3 |
| 1,179,580 | 12/1958 | France | 174/72 A |
| 1,515,634 | 8/1969 | Germany | 317/122 |
| 1,078,193 | 8/1967 | United Kingdom | 174/72 A |

OTHER PUBLICATIONS
Catalog No. 71 entitled "Cambion Press-Mount Teflon* Terminals," published by Cambridge Thermionic Corp. in Dec. 1961, last page relied on.

*Primary Examiner*—Laramie E. Askin
*Attorney, Agent, or Firm*—Hauke, Patalidis & Dumont

[57] ABSTRACT

A wiring duct and wire holder modular system for use in wiring electrical equipment as used in control panels and electrical cabinets for machine tools, industrial installation, computers and the like. The wiring duct or wireway system of the invention consists of modular units for supporting and distributing to electrical equipment a plurality of electrical conductors which are routed through a plurality of wiring duct modular units interlocked end to end or at a right angle to each other for forming branching wireways, or T-connections, and turns, or L-connections. Each modular unit consists of a base member, preferably provided on each end with interlocking means for connection to a second modular unit disposed in alignment therewith so as to form a guideway of an appropriate length, and of a row of pins mounted on two parallel edges of the base member, each pin having a foot portion for insertion into a mounting aperture in the base member, an appropriate slotted locking means being disposed in the foot portion of the pin for secure engagement in the mounting aperture such that each lateral row of pins form a sidewall for the guideway. The pins are provided with an enlarged head portion so as to form between consecutive pins a space through which individual electrical conductors may be routed through the sidewall of the guideway. The electrical conductors may be threaded through the spaces between consecutive pins, or a pin may be manually deflected such as to increase the spacing between the enlarged heads of consecutive pins so that an electrical conductor may be slipped into the space. The juxtaposed enlarged head portions of the pins retain the electrical conductors through the spaces when the pins are in their normal aligned position.

A corner modular unit is also provided by the invention, consisting of a substantially square base member provided with pin mounting apertures along each side of the base. Pins are inserted in appropriate mounting apertures to provide either a closure end wall for a duct, or an appropriate L or elbow connection between two ducts.

26 Claims, 13 Drawing Figures

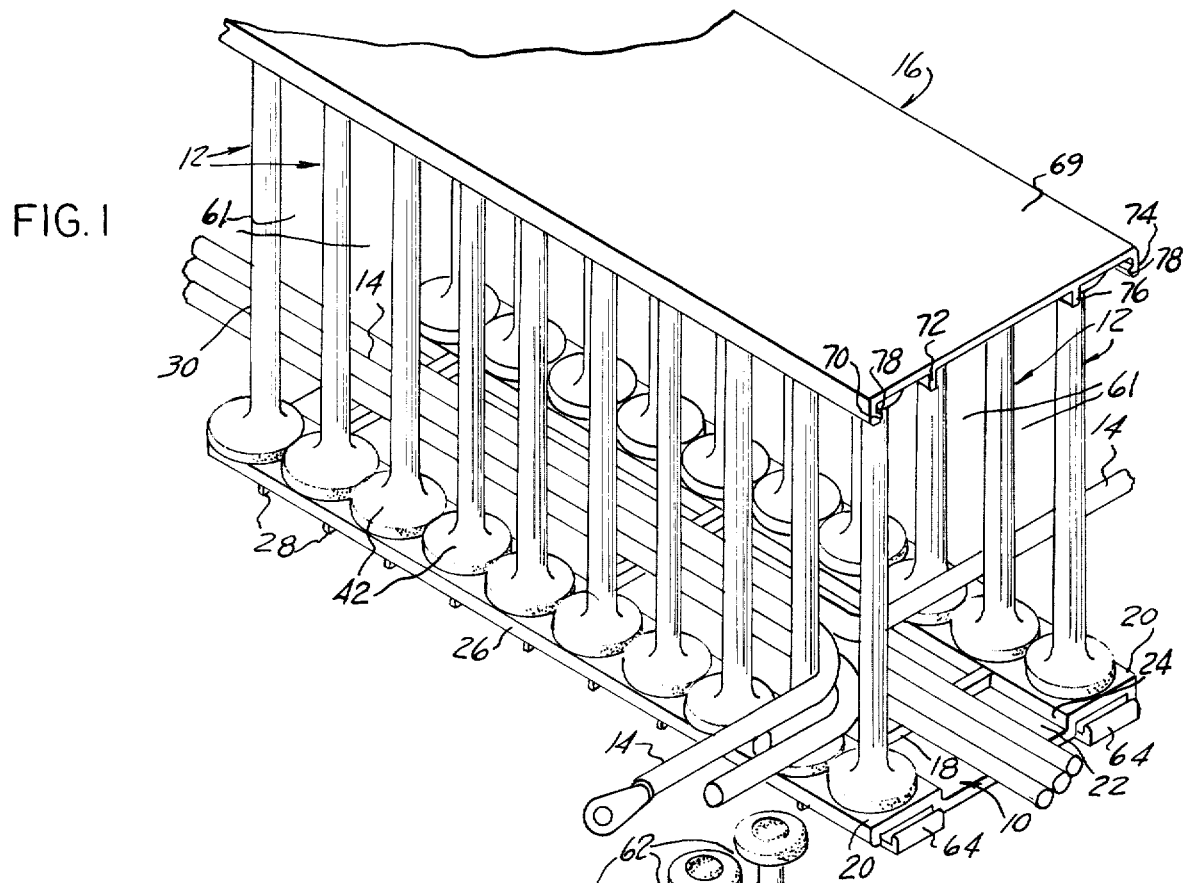
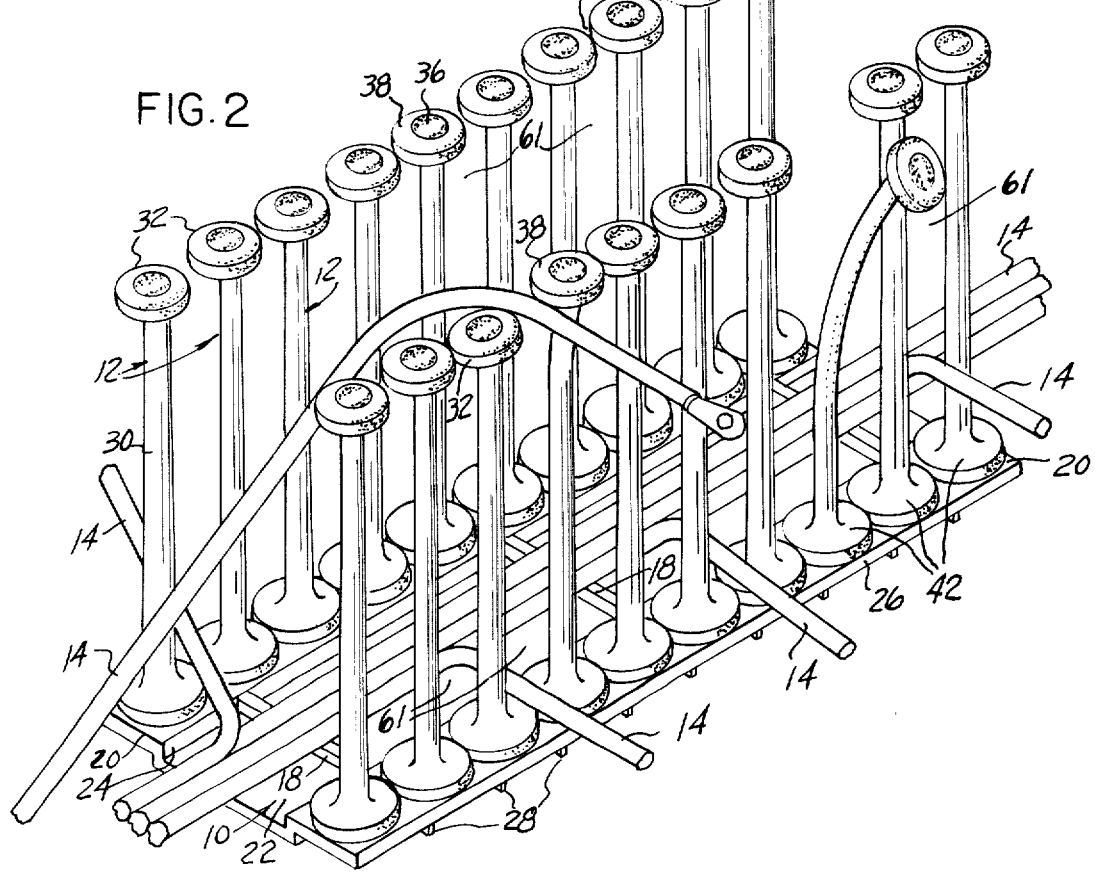

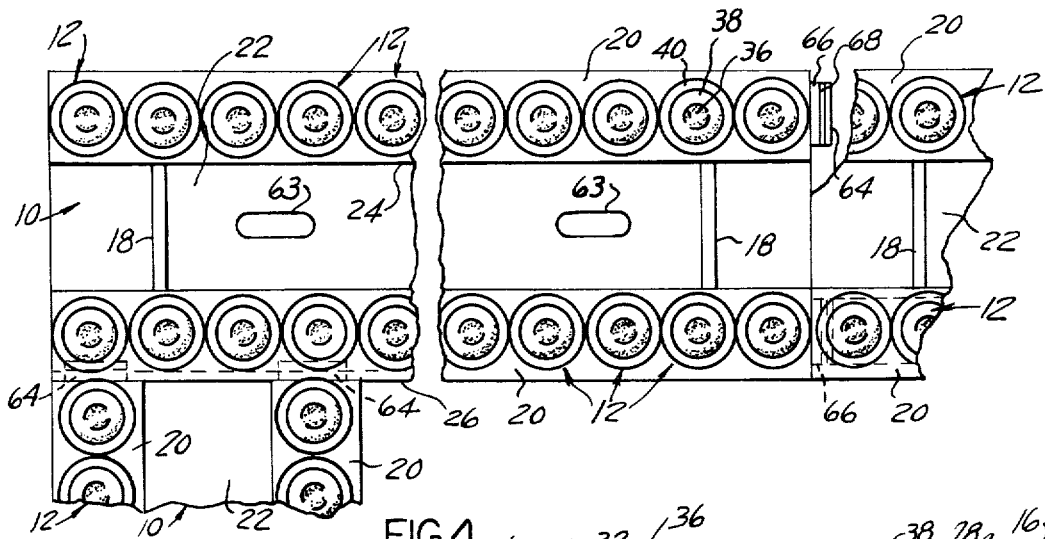
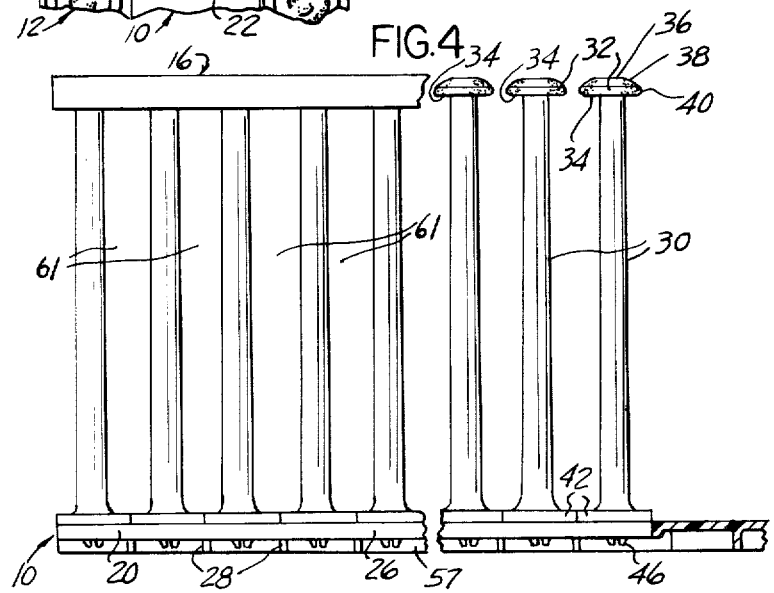
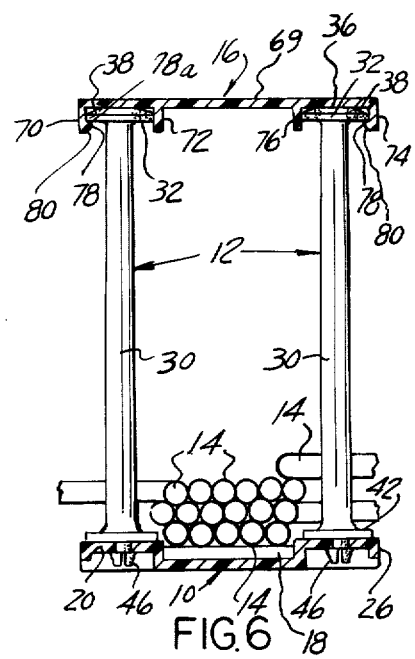
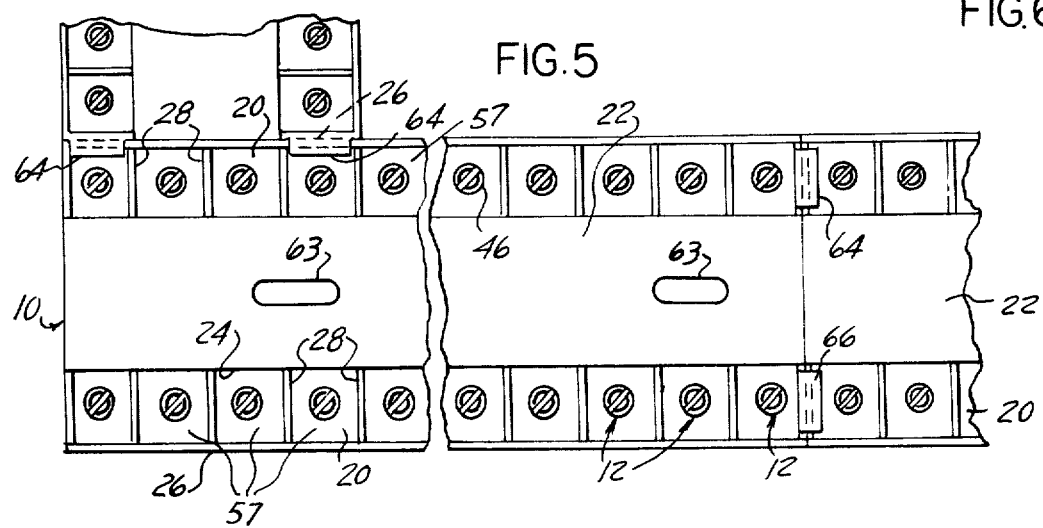

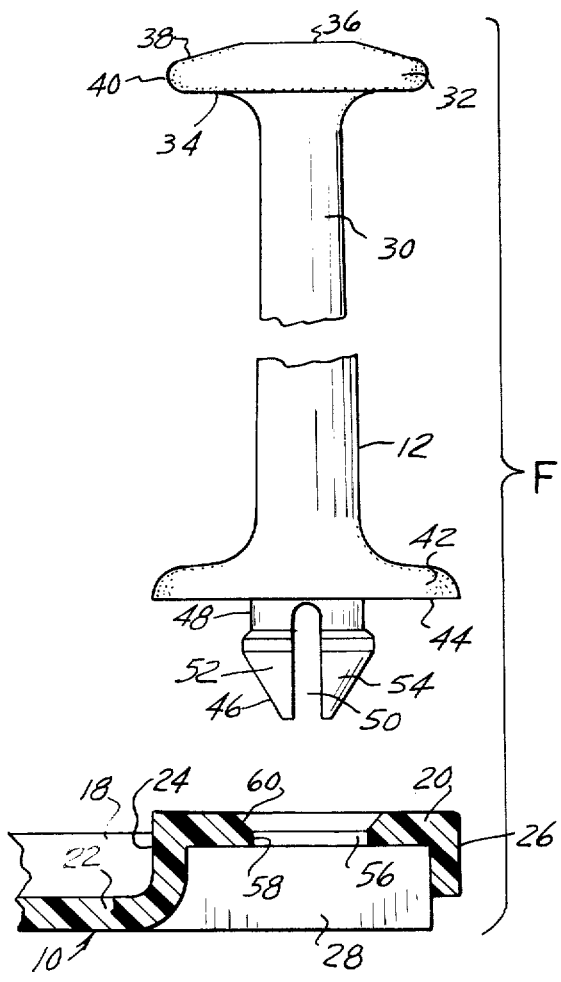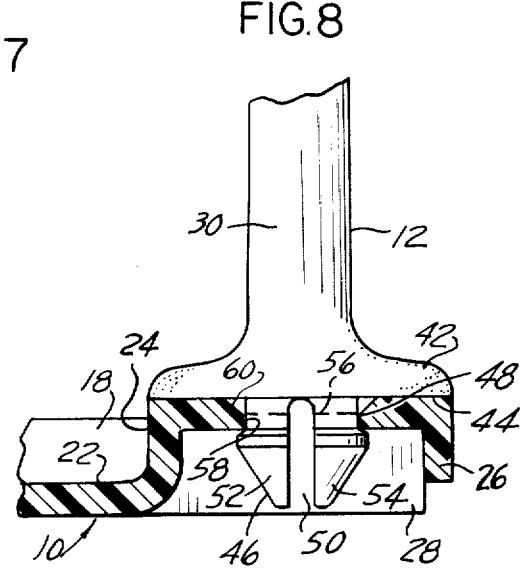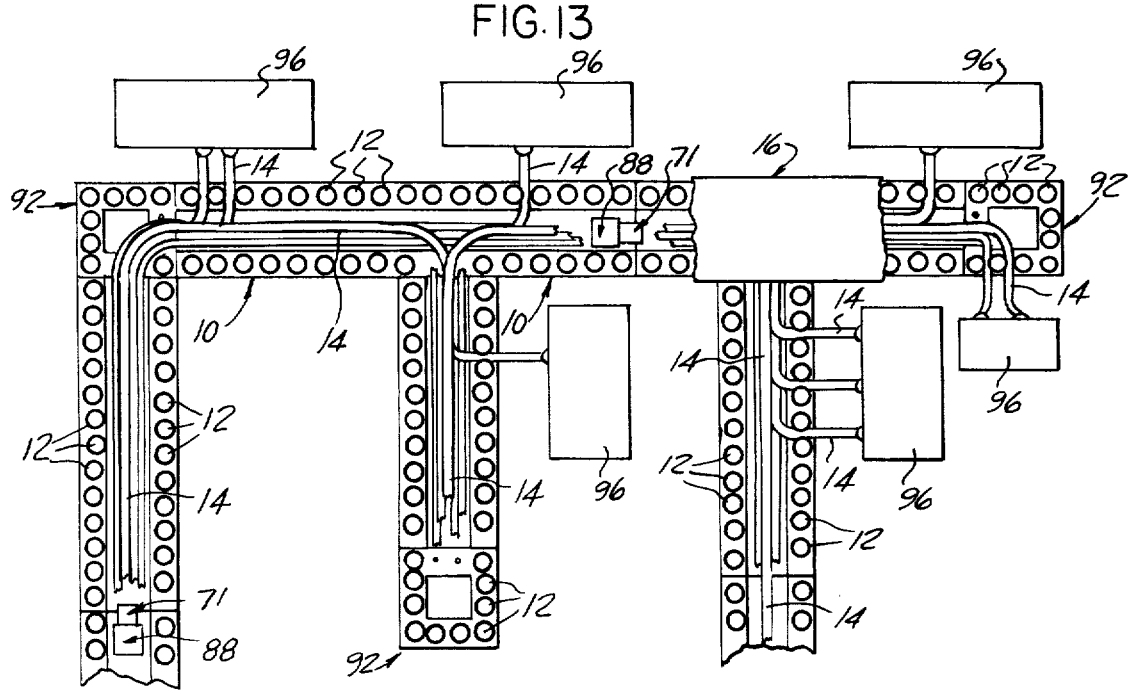

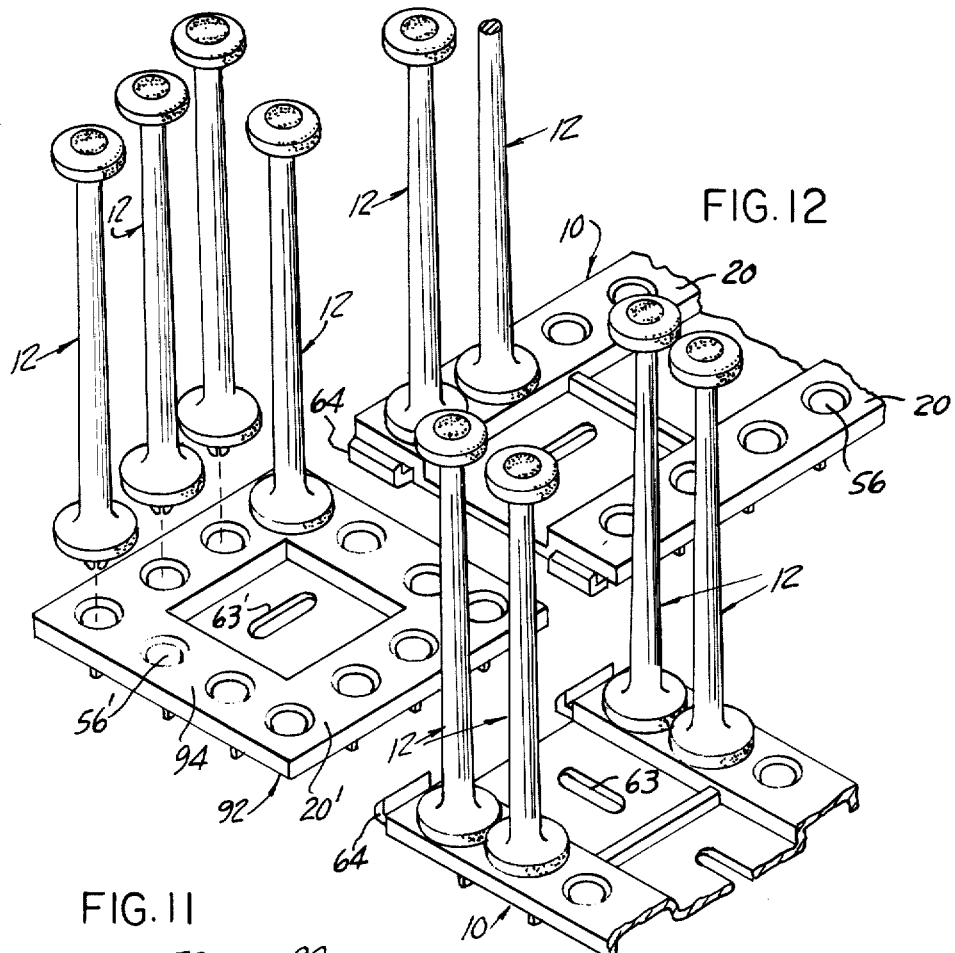
FIG. 12
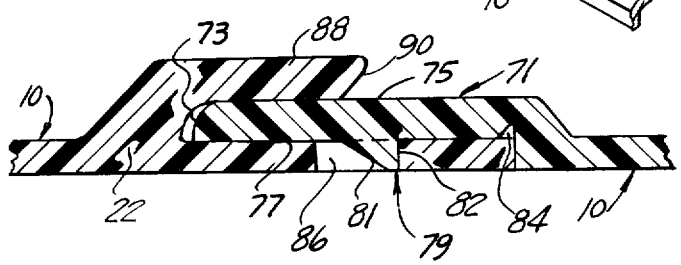
FIG. 11
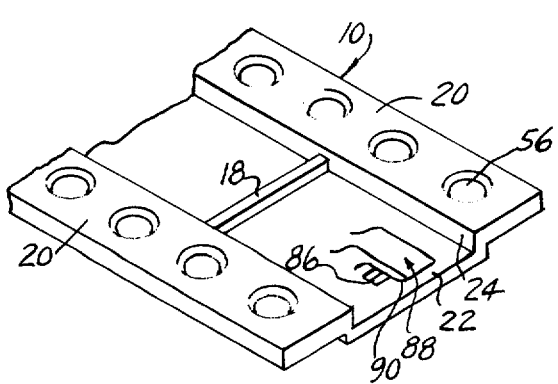
FIG. 10
FIG. 9

MODULAR WIRING DUCT AND WIRE HOLDER SYSTEM

BACKGROUND OF THE INVENTION

The present invention relates to wiring ducts, or wireways, for supporting and holding bundles of electrical conductors interconnecting diverse components in control panels and electrical cabinets.

Wiring ducts in the form of a U-shaped channel are known for use in holding, supporting, retaining and distributing electrical conductors in an orderly manner within an electrical cabinet, on a control panel, or the like. The electrical conductors are routed within the wiring duct channels from one location to another, and from the channels to diverse electrical components which are electrically interconnected by means of the conductors.

In apparatus wherein a plurality of electrical conductors or wires are used for interconnecting diverse components, such as in control panels and cabinets for machine tools, welders, electrochemical machining machines, electrical discharge machines, and the like, it is desirable to obtain a neat routing of the interconnecting electrical conductors, and a sturdy support of the conductors to avoid chafing of the insulation, breaking of the wire, and other problems. Such a neat arrangement, holding, routing and distribution of the conductors is often complicated in view of the limited space available inside an electrical cabinet, the multitude of conductors and the number of the varied elements interconnected. Although the diverse electrical conductors are sometimes placed together in the form of a bundle or harness which is in turn attached to a supporting panel by appropriate clips or straps, it has become a generally accepted procedure in the field, for the sake of neatness, convenience and safety, and for the ease of repair which may require replacement of some of the electrical components and rerouting of the circuit wires, to place the electrical conductors through one or several wiring ducts or wireways. The wiring ducts are generally in the form of a U-shaped channel which is cut to appropriate length to fit the installation. Such U-shaped channels are sometimes made of stamped metal or metallic grillwork, but generally they are made of a relatively flexible plastic material having good electrical insulation qualities. The U-shaped channels are attached to a support panel by way of conventional fasteners, such as screws, rivets and the like, passed through appropriate mounting holes disposed in the base of the channels, or they are held in position by means of clips or like means. The electrical conductors required for the installation are routed between electrical components through the ducts, and the ducts are provided with apertures in their sidewalls permitting individual conductors from the bundle within the ducts to be routed into and from the ducts for connection to appropriate electrical components at various locations. The apertures may be in the form of circular holes and elongated slits, such holes and slits being often open to the edge of the channel sidewall, preferably by way of a restricted passage, the restricted passage permitting the conductors to be passed through the sidewalls by deflecting the portion of the sidewall between two apertures such as to widen the restricted passage and permit slipping the conductors into or from the aperture. Closed slits and other closed apertures require the conductor end to be threaded through the aperture or, alternatively, require the installer to snip the portion of the sidewall between the aperture and the edge of the sidewall to form a cut so as to enable the slipping of the conductor into the aperture. The advantage of providing slits, or other apertures, in the sidewalls of the channels which are open to the edge of the sidewall is that a conductor may be removed from the channel, for tracing of a circuit, for example, without disconnecting the conductor from the terminal of the electrical component to which it is connected, or without attempting to thread the conductor, which may be provided with a relatively large lug or other connecting means, through an aperture in the sidewall too small to accommodate the passage of the lug or other connecting means because of its restricted size or because of the number of conductors already passing through the aperture. Once the electrical installation is completed, a cover provided with appropriate lips interlocking with the side of the sidewalls is snapped on the channel.

Because wiring ducts are, as previously mentioned, preferably made of relatively flexible thin plastic materials, once the duct is filled with electrical conductors, the duct sidewalls tend to bulge outwardly, which makes it difficult to place the cover on the duct. In structures where the duct is provided with wall apertures which are not open to the edge of the sidewalls, it is often sufficient to engage the cover with the sidewalls at one end of the duct and progressively push the cover onto the duct from that end to the other end of the duct. However, if the duct is of the open-slit variety, that is of the type having slits or other openings open to the edge of the sidewalls, considerable difficulties are encountered in closing the duct by means of the cover as each section of the sidewall between two consecutive slits must be individually engaged between the sides of the cover, especially when the amount of electrical conductors contained in the duct is such as to increase the normal tendency of the sidewalls to bulge outwardly. Plastic wiring ducts or channelways are conventionally extruded in the form of a U-shaped channel, and the mounting holes in the base of the channel and the sidewall apertures are subsequently punched out on a punch press. The choice of material used for extruding the channel is limited as such choice is restricted to thermo-plastic materials. The strength of the sidewalls is also limited in view of the relative thinness of the channel walls and base, with the result previously mentioned that the sidewalls deform easily and tend to bulge outwardly.

The punched-out wall apertures have sharp corners and, if the punch and die are not properly maintained, a feather-edge burr is formed at the edge of the apertures. The presence of sharp and sometimes burred edges cutting into the electrical conductor insulation causes problems.

It would therefore be of great advantage to provide a wiring duct or wireway made of a dielectric plastic material which can be molded from a variety of either thermo-plastic or thermo-setting plastic materials as a function of the availability of raw materials, which would have substantially strong sidewalls capable of holding a great quantity of conductors placed in the duct without causing outward bulging of the sidewalls, which would be provided with apertures slotted to the edge of the sidewalls to form a restricted passage to the edge of the sidewall such as to permit deflection of a sidewall section between consecutive apertures for slipping a conductor from outside of the sidewall into the aperture, and vice versa, while being sufficiently rigid to hold the conductor in position without the cover being placed on the duct. It would furthermore be advantageous to provide a wiring duct with a cover which may be easily snapped in position and which is sturdily attached to the duct without presenting difficulties for removal, and which affords large open areas through the walls for the passage of electrical conductors without weakening the strength of the sidewalls.

Those advantages, and additional advantages which will become apparent to those skilled in the art, are present in the present invention. The present invention contemplates a modular wiring duct system made of interlocking duct modular units which, when disposed end-to-end, provide a wiring duct of an appropriate length. Each modular unit consists of a molded base portion provided with appropriate stiffening ribs and with mounting apertures, and having at each end appropriate interlocking means for connection to another modular unit disposed in alignment therewith. A sidewall is formed along the edge of the base portion by a row of elongated relatively slender pins provided with an enlarged head, such that a relatively large area opening is provided between two consecutive pins for the passage of electrical conductors through the sidewalls. The electrical conductors are retained in the opening as a result of the interference provided by two adjacent enlarged pin heads preventing the electrical conductors from slipping off the opening until the cover is placed on the duct. The pins are molded with an appropriate cross section, preferably circular, such as to provide a smooth rounded contact with the insulation of the electrical conductors, and such as to be easily manually deflected laterally in any direction, while still being provided with considerable holding power for the conductors disposed in the duct. Preferably yet, the pins are molded with a slight taper from bottom to top such as to have an increased strength where most required, namely at the root of the pins where they are attached to the base.

The pins are mounted in appropriate apertures disposed along each of the parallel sides of the base portion and the end of each pin mounted on the base portion has a tapered projecting portion snapped into the aperture in the base portion for providing sturdy mounting and ease in assembly. Any length of wiring ducts may be provided by mounting the modular units end-to-end or at right angle for forming T- and elbow, or L-, connections. In addition, a corner unit forming part of the system is provided by the present invention for installation where it is desired to close an end of a duct or to provide an L-connection with apertured sidewalls. An appropriate cover is part of the system of the invention to provide a closure for the wiring ducts used in electrical installations. By omitting one of the sidewalls, the structure of the present invention provides fanning strips and the like, and, in addition to having many applications in the electrical equipment wiring art, the structure of the present invention may be used as a holding and distribution duct for fluid hoses and the like, or as a holder for a plurality of articles such as strings, ropes, smoking pipes, etc., and as racks for small tools, neckties and the like.

SUMMARY OF THE INVENTION

The present invention therefore relates to a novel wiring duct modular system permitting the installation of wiring ducts of any appropriate length by means of a plurality of wiring duct modular elements disposed end-to-end and/or at right angles to each other. The modular units are made of molded plastic material, and have a considerably improved holding power for the electrical conductors and the like routed through the ducts, as compared to conventional extruded U-channel wiring ducts. The diverse objects and advantages of the present invention result from the structure contemplated consisting in a molded base which may be made in a variety of lengths and widths, provided with sidewalls formed by separate pins which may be made in a variety of lengths such that a relatively small inventory of disassembled elements, namely bases and pins, satisfies any usual requirement in wiring ducts width, height and length. The pins are assembled to the base by way of mounting apertures disposed in the base and into which are engaged the tapered slotted end of each pin. While the projecting end of the pin is introduced into the mounting aperture in the base, it is automatically contracted to permit the insertion until a peripheral groove in the pin engages the mounting aperture, thus sturdily fastening the pin to the base. The assembly operation may be easily automated, and the modular elements may even be supplied to the user in a kit form consisting of separate bases and pins.

The obvious objects and advantages of the present invention will become apparent to those skilled in the art when the following description of the preferred embodiments is read in conjunction with the accompanying drawings wherein:

BRIEF DESCRIPTION OF THE DRAWINGS

FIG. 1 is a fragmentary perspective view of an example of a wiring duct modular unit according to the invention as used for holding and separating electrical conductors, the wiring duct modular unit being provided with an appropriate cover;

FIG. 2 is another perspective view of the modular unit of FIG. 1, with cover removed, showing the manner in which electrical conductors are passed through the sidewalls of the wiring duct of the invention without threading through the sidewall openings;

FIG. 3 is a top plan view of a wiring duct modular unit of the invention, without cover;

FIG. 4 is a side elevation thereof, with a fragment thereof provided with a cover;

FIG. 5 is a bottom plan view thereof;

FIG. 6 is an end view thereof, partially in section, shown with a cover and a plurality of electrical conductors contained therein;

FIG. 7 is an exploded enlarged detail view of an example of pin and base portion structures prior to mounting the pin into the base portion;

FIG. 8 is a view similar to FIG. 7, but showing the assembled pin and base portion;

FIGS. 9 and 10 illustrate an example of interlocking means provided on the ends of the modular unit base member portion;

FIG. 11 is a longitudinal section through the interlocking means of FIGS. 9 and 10 shown in their interlocked position;

FIG. 12 is a perspective partial view of an example of use of a corner modular unit for making an L- or right angle junction between two wiring duct modular units of the invention; and FIG. 13 is a schematic representation of a typical electrical wiring assembly utilizing the modular wiring duct system of the present invention.

DETAILED DESCRIPTION OF THE PREFERRED EMBODIMENTS

The wiring duct system of the invention consists of a basic modular unit which, as illustrated at FIGS. 1–6, comprises a base member portion 10 provided with a pair of parallel sidewalls disposed at two parallel sides of the base member 10, each sidewall being formed by a row of pins 12. In this manner, each base member 10, provided with two parallel rows of pins 12, forms a U-shaped channelway through which may be routed a plurality of electrical conductors, as shown at 14 in FIGS. 1, 2 and 6. The channelway may be closed by means of a cover 16, best shown at FIGS. 1, 4 and 6.

The base member 10 is preferably made of a rectangular shaped molding of plastic material, relatively thin for economy of material and lightness, but provided with appropriate stiffening ribs 18 formed on the upper surface of the central portion 22 thereof and disposed transversely between two substantially U-shaped integral edge portions 20 intended to support the pins 12. Each edge portion 20 is connected to the central portion 22 of the base member 10 by an integral vertical wall 24, and is provided with an exterior wall 26 having a terminal edge ending slightly above the plane of the lower surface of the central portion of the base member 10. Stiffening transverse walls 28 are formed at regular intervals at the bottom of the edge portion 20 of the base member, having an edge flush with the plane of the lower surface of the central portion 22 of the base member 10, such that when the base portion 10 is disposed on a surface it is fully supported by that surface across its full width.

The pins 12 are molded of a relatively stiff, while at the same time flexible, plastic material and have an elongated body 30 of any convenient cross section such as square, rectangular, oval, and the like, but preferably a circular cross section. Also preferably, and as illustrated, the body 30 of the pins 12 is slightly frusto-conical, that is with a diameter proximate the base larger than the diameter proximate the free end of the pins. As best shown in the view of FIG. 7, the free end of each pin is formed with an enlarged head portion 32 which is preferably mushroom-shaped, with a flat annular lower surface as shown at 34, a flat upper surface 36 of substantially smaller diameter than the overall diameter of the enlarged head portion 32, and a frusto-conical surface 38 disposed between the top surface 36 of the enlarged head portion 32 and the rounded side 40 of the enlarged head. Each pin 12 has a foot portion comprising a radially extending flange 42 having a substantially flat lower surface 44, and an integral projecting tapered end portion 46. The tapered end portion 46 has a reduced diameter portion 48 defining a peripheral groove disposed proximate the radially extending flange 42. The tapered end portion 46 is provided with an axially disposed longitudinal slit 50 extending from the tip of the tapered end portion 46 to approximately level with the bottom surface 44 of the flange 42, so as to form a pair of bifurcated sections 52 and 54.

As also best shown at FIG. 7, the edge portion 20 of the base member 10 is provided with an aperture 56 for accepting therethrough the projecting tapered end portion 46 of each pin 12. The aperture 56 has a narrow section 58 of a dimension corresponding to the dimension of the groove portion 48 of the pin, a frusto-conical countersunk section 60 being disposed towards the upper surface of the base member edge section 20, such that when the projecting tapered end portion 46 of the pin 12 is forcibly inserted into the aperture 56, such insertion is greatly facilitated by the tapered shape of both the frusto-conical portion 60 of the aperture 56 and the tapered shape of the pin projecting portion 46. The engagement of the pin projecting tapered end portion 46 into the aperture 56 causes the two bifurcated portions 52 and 54 to progressively bend towards each other, due to the resiliency of the pin material, thus laterally contracting the pin projecting end portion 46 until the reduced diameter or groove portion 48 become lodged into the reduced diameter section 58 of the aperture 56, at which time the bifurcated portions 52 and 54 of the projecting end portion of the pin return to their normal positions, thus solidly holding the pin in position, as is illustrated at FIG. 8. The length of the pin projecting tapered end portion 46 is such as to clear the support surface, such length being less than the height of the walls 28. The walls 24, 26 and 28 of the base member edge portion 20 form a plurality of pockets or recesses 57 at the bottom of base member 10.

If so desired, the surface of the pin groove 48 may be coated with an appropriate cement or, alternatively or in addition, the lower surface 44 of the pin flange 42 may also be coated with a cement. It will be appreciated, however, that the use of cement is not required as the structure of the projecting end portion 46 of the pin provides an adequate locking engagement of the pin projecting end portion 46 in the aperture 56 in the base member. If it is desired to remove a pin, pliers may be used for compressing the projecting end portion 46 of the pin by bending the bifurcated portions 52 and 54 toward each other sufficiently to permit the removal of the pin from the aperture 56, or the pin projecting end portion 46 may simply be broken off.

Because the pins 12 have a relatively slender body 30, a maximum cross area is provided for the space, designated by numeral 61, between two consecutive pins 12 for the passage of electrical conductors from inside of the duct to the outside. As the pins 12, although flexible, are nevertheless substantially stiff, each row of pins defines a sidewall for the duct which resists outward deflection and is not subject to outward bulging as is the case in conventional thin plastic wiring ducts. However, each individual pin 12 may be manually easily deflected, as shown at FIG. 2, such that the gap or restricted passage 62 formed at the top of each lateral wall between consecutive enlarged head portions 32 of the pins may be manually widened sufficiently to permit an electrical conductor to be slipped into the space or opening 61. Because the bottom annular surface 34 of the enlarged head portion 32 of each pin is relatively flat and the gap or spacing 62 is preferably less than the diameter of the electrical conductors, once an electrical conductor is passed through a space or opening 61, it remains routed through the space or opening 61 and is, for all practical purposes, entrapped in the space or opening 61 through the sidewall such that even an inadvertent upward pull on the electrical conductor does not remove it from the space or opening 61.

Because the pins 12 can be deflected in all directions, a conductor may be inserted between two pins, also shown at FIG. 2, by simply disposing the conductor approximately at the gap or spacing 62 and pressing downwardly, thus deflecting two contiguous pins 12 laterally in opposite directions along the axis of the duct sidewall, as the result of the periphery of the conductor being pressed against the tapered upper surface 38 of the enlarged pin heads 32. It is evident that in order to tend to trap any electrical conductor 14 in the space 61 through the duct sidewall, the gap or spacing 62 separating the enlarged head portions 32 of the pins is preferably less than the diameter of the electrical conductor. It will be appreciated that the dimension of the enlarged head portions 32 of the pins 12 may be arbitrarily chosen to cause the enlarged head portions 32 of consecutive pins to laterally engage each other, such that electrical conductors of any size, once snapped into the space 61, are safely retained in that space.

Once an electrical installation is completed, if so desired, a cover 16 may be used to close the open end of the wiring ducts. As shown at FIGS. 1 and 6, the cover 16 is made of a preferably extruded elongated and relatively thin piece of plastic forming a substantially flat planar portion 69 provided on a surface with a parallel pair of parallel integrally formed flanges, designated respectively by numerals 70 and 72, and 74 and 76. At least one flange in each pair, namely in the example illustrated the flanges 70 and 74, is provided with a laterally projecting lip portion 78. The distance between two flanges in each pair is substantially equal to the diameter of the enlarged head portion 32 of the pins 12, and each pair of flanges is located such that when the cover is pressed down in position, the flanges 70 and 74 are resiliently deflected as a result of the ramps provided at the engagement of the angled portion 80 of each flange lip 78 with the angled surface 38 of the enlarged pin head 32, until the top flat surface 36, FIG. 6, of the enlarged head portion of the pins abuts against the lower surface of the cover 16 between the two flanges 70 and 72, and 74 and 76, at which time the edge flanges 70 and 74 resiliently return from their deflected position to their normal position, thus engaging the projecting lip portion 78 with the bottom of the enlarged head portion 32 of the pins. If it is desired to remove the cover 16, it is sufficient to lift the cover at one end to disengage the flanges from the first enlarged pin head portion. The disengagement is facilitated by the angled shape 78a of the top of the lip portion 78, and the spreading apart of the flanges 70 and 72 and 74 and 76, respectively, while being disengaged from the first enlarged head portion 32 of the first pin in a row causes a slight spreading apart of the flanges at a location corresponding to the next enlarged pin head portion, and so on along a complete row of pins, with the result that the cover is easily removed.

As best seen at FIGS. 3 and 5, the base member 10 has a plurality of mounting apertures 63 disposed through the central portion 22 of the base member, for accepting appropriate fasteners such as screws or rivets for mounting of the ducts on a panel or any convenient support surface. Alternatively, clips may be used for mounting the modular units on the support surface, or the bottom surface of the central portion 22 of the base member may be provided with an adhesive, preferably in the form of a coating of pressure sensitive adhesive protected by a release paper which is peeled by the user prior to mounting the duct section or modular unit on a support surface. A combination of fastener and adhesive may obviously also be used for mounting the duct sections on the support surface.

The ends of the base member 10 are preferably provided with interlocking means for mechanically interconnecting a plurality of modular units to make wiring ducts of any suitable length. An example of such interlocking means is illustrated at FIGS. 1, 3, 4 and 5, consisting of a hook-like generally U-shaped tab 64 integrally formed on one end of the base member 10 at a location aligned with each of the edge portions 20. Each hook-like tab 64 comprises a forward extending short portion 66, and an upstanding integral member 68. In use, the upstanding members 68 at the end of a modular unit base member are disposed beyond the end wall of the edge portion 20 of the base member of a modular unit disposed end-to-end therewith. The hook-like tab 64 also allows a pair of modular units to be mounted at a right angle to each other, by disposing the end of the modular unit provided with the hook-like tab 64 in abutment against a side of the other modular unit, the upward projecting member 68 of the tab 64 being disposed within one of the pockets or recesses 57 at the bottom of the base member 10, as illustrated at FIGS. 3 and 5.

Another example of modular unit interlocking means is illustrated at FIGS. 9 and 10, and it will be appreciated that the interlocking means of FIGS. 9 and 10 may be used in addition to, or instead of, the interlocking means consisting of the hook-like tabs 64 precedently described. As shown at FIG. 9, an end of the base member 10 has a substantially axially disposed integrally formed tongue 71 projecting beyond the end of the central portion 22 of the base member. The tongue 71 has an upwardly slanted or curvilinear leading edge 73, a flat upper surface 75 and a generally flat lower surface 77 provided with a downardly extending wedge-like portion 79 provided with a forward angled surface 81 and a rear wall surface 82 disposed at a right angle to the lower surface 77 of the tongue. A breakaway transverse weakening groove 84 is formed substantially flush with the end of the base member 10 such that the tongue 71 may be broken off if not used.

The other end of the base member 10, shown at FIG. 10, is provided with a recess 86 in the central portion 22 for accepting the wedge-like projection 79 of the tongue 71 of the next consecutive modular unit. A forward projecting tab 88, integrally formed above the recess 86, has a downwardly slanted or curvilinear leading surface 90 such that a pair of modular units can be interlocked, as shown at FIG. 11, by introducing the tongue 71 on one end of a modular unit below the tab 88 at the end of the other modular unit, and by longitudinally displacing one modular unit relatively to the other until the wedge-like projecting member 79 on the bottom of the tongue 71 projects into the cavity 86. The slanted or curvilinear leading surfaces 73 and 90, respectively, of the tongue 71 and of the tab 88 facilitate the introduction of the tongue 71 below the tab 88, and the tab 88 deflects upwardly sufficiently to accommodate the combined thickness of the tongue 71 and the projecting wedge-like member 79 until the wedge-like member 79 drops into the recess 86, with its flat right angle surface 82 abutting against the forward edge of the recess 86, in the position indicated at FIG. 11. The relative dimensions of the elements are such that in the interlocking position the two adjoining base members abut against each other. In structure where the end of the base member is also provided with the hook-like interlocking tabs 64, the tabs 64 may also be used in addition to the interlocking means precedently described for interlocking one modular unit with another, as the material used for molding the base members 10 can be deflected enough for introducing the upstanding portion 68 of the brackets below the end wall of the base member 10.

The system of the invention further contemplates the provision of a corner modular unit 92, as shown at FIG. 12. The corner modular unit 92 comprises a substantially square base member 94, structurally similar to the modular unit base member 10, but provided with an edge portion 20' on its four sides. The corner modular units are preferably supplied to the user in a kit form consisting of the base member 94 and a plurality of loose pins 12. In use, the corner base member 94 is mounted on the support surface by means of a fastener passed through a mounting aperture 63', and a pair of modular units are attached to two consecutive sides of the corner modular unit 92, in a manner similar to that hereinbefore explained in relation to interlocking a pair of modular units by means of the end hook-like tabs 64. If one of the modular units abutting the corner unit has a tongue 71 projecting from the end of its base member 10, the tongue is broken off as previously explained. Once the pair of modular units and the corner modular unit 92 are affixed to the support surface, pins are manually introduced into the mounting apertures 56' on the two other sides of the modular unit 92, so as to effect a corner sidewall closure for the wiring ducts.

The corner unit may also be used to provide a closure wall at the end of a wiring duct by mounting a corner base member 94 in alignment with the last modular unit forming the duct and placing pins 12 on three sides of the base plate member 94. Such an arrangement is illustrated at the end of the horizontal duct schematically illustrated at FIG. 13 and at the end of the second vertical duct in that Figure.

As also shown at FIG. 13, a plurality of modular duct units and corner units according to the invention can be used in any appropriate pattern mounted on a support surface for an electrical installation wherein a plurality of electrical elements, as shown at 96, are interconnected by means of the electrical conductors 14 disposed in and held by the ducts. The electrical conductors which are attached to the terminals of the electrical components 96 are passed between a pair of consecutive pins 12 through the wall of the duct, either by threading the electrical conductors through the space between adjoining pins or by deflecting one of the pins as previously explained. Once the electrical installation is completed, a removable cover 16 is snapped on the top of the pins to provide a top closure for the wiring ducts.

The structure of the present invention can also be used as a fanning strip, that is a device which in operation spreads and holds the diverse conductors in a cable either singly, by pair or by any appropriate number. In such arrangement, one of the sidewalls is generally unnecessary and is omitted.

It will be obvious to those skilled in the art that the structure of the modular unit of the present invention also lends itself to many uses other than those primarily contemplated for the invention. For example, the modular units may be mounted on a wall as a holder for diverse hand tools, cables, strings and threads, or they can be used as necktie racks.

Having thus described the invention by way of typical structural embodiment thereof, what is claimed as new is as follows:

1. A holder for supporting, containing and distributing a plurality of electrical conductors, said holder comprising a base plate member made of plastic material and having a lower and an upper surface, interlocking means disposed at each end of said base plate member for interlocking said member with another, a plurality of aligned apertures disposed substantially parallel to one edge of said plate member, pins on the upper surface of said plate member each disposed in one of said apertures, each of said pins being made of plastic material and having an elongated body portion provided at an end thereof with an enlarged head portion and at the other end thereof with a foot portion for mounting on said plate member, said body portion having a frusto-conical shape of decreasing diameter from proximate the foot portion thereof to proximate the enlarged head portion thereof and said foot portion comprising a radially extending flange portion in engagement with the upper surface of said base plate member and a tapered projecting portion inserted in said aperture and having a major lateral dimension section slightly larger than said aperture, a peripheral groove disposed proximate said major lateral dimension section, said groove being so dimensioned as to snuggly fit in said aperture, a longitudinal slot formed in said projecting portion and extending at least partially through said groove for allowing said projecting portion to laterally resiliently contract during insertion into said aperture and to laterally resiliently expand for holding the foot portion of said pin with said groove in said aperture, and a recess formed in the lower surface of said plate member accommodating said projecting portion of said pin, wherein a plurality of said pins is disposed in a row defining a wall provided with a plurality of openings each of which is formed between two adjecent pins for passage of electrical conductors through said openings and each of said pins is resiliently flexible for deflection of the free end thereof, whereby the enlarged head portion of said pin is deflected away from the enlarged head portion of adjacent pins for providing a spacing between said adjacent enlarged head portions wide enough to accept an electrical conductor therethrough for routing of said electrical conductor through an opening between two consecutive adjacent pins.

2. The holder of claim 1 wherein the enlarged head portion of each pin engages the enlarged head portion of each adjacent pin.

3. The holder of claim 1 wherein said pin has a circular cross section.

4. The holder of claim 1 wherein each of said apertures in said base plate member has a conical countersink disposed toward the upper surface of said base plate member facilitating the insertion of the tapered projecting portion of the foot portion of said pin.

5. The holder of claim 1 wherein the projecting foot portion of said pin is cemented in said aperture in the base plate member.

6. The holder of claim 1 wherein said flange portion is cemented to the surface of said base plate member in engagement therewith.

7. The holder of claim 1 wherein said interlocking means comprises a pair of U-shaped upstanding integral tabs formed on at least an end of said plate member, said tabs being so spaced and disposed as to be engageable in one of said recesses in the lower surface of said plate member for interconnecting a pair of said holders disposed with their longitudinal axes at a right angle to each other.

8. The holder of claim 1 further comprising a plurality of aligned apertures disposed proximate each of two parallel edges of said plate member, one of said pins being mounted in each of said apertures such as to provide a pair of substantially parallel rows of pins for said holder.

9. The holder of claim 8 further comprising a removable cover comprising a plate element, a pair of substantially parallel edge wall portions each formed along an edge of said plate element, and a pair of substantially parallel intermediate wall portions each disposed parallel to and a predetermined distance away from each of said edge wall portions engaging diametrically opposite sides of the enlarged heads of said pins of a row, the edge portion of at least one of said walls having a laterally projecting lip engaged below the enlarged head portion of said pins and securedly interlocking said cover with said enlarged head portions.

10. The holder of claim 1 wherein mounting apertures are disposed through said base plate member for mounting upon a surface by means of fasteners.

11. The holder of claim 1 wherein an adhesive is disposed as a coating on the lower surface of said base plate member for mounting upon a surface.

12. The holder of claim 1 wherein said interlocking means comprises a tongue projecting at one end of said base plate member, a recess disposed proximate the other end of said base plate member, a wedge-like projection dependent from said tongue engageable in said recess, and a tab extending above said recess for guiding said tongue and forcing said wedge-like projection into said recess when the tongue at the end of a base plate member is engaged between the tab and the recess at the end of another base plate member.

13. A modular holder unit for supporting and distributing a plurality of elongated flexible objects, said holder unit comprising a rectangular base member, a plurality of substantially equidistant pins disposed in a row parallel to one of the sides of said rectangular base member, said pins being of substantially equal length and each provided with an elongated body portion provided at its free end with an enlarged head portion, said row of pins defining an apertured wall provided with a plurality of openings each of which is formed between the body portions of two adjacent pins for passage of said elongated flexible objects through said openings, and interlocking means integrally disposed at each end of said base member for securely connecting a plurality of individual modular holder units in an end-to-end relationship to form an apertured wall of a predetermined length, wherein said base member has a plurality of aligned apertures disposed substantially parallel to an edge of said base member, and each of said pins has a foot portion comprising a radially extending flange portion engaged with the upper surface of said base member and a tapered projecting portion inserted through one of said apertures and having a major lateral dimension section slightly larger than said aperture, a peripheral groove disposed proximate said major lateral dimension section, said groove snuggly fitting in said aperture, a longitudinal slot formed in the projecting portion and extending at least partially into said groove for allowing said projecting portion to laterally resiliently contract during insertion into said aperture and to laterally resiliently expand for holding the foot portion of said pin with said groove in said aperture, and a recess formed in the surface of said base member accommodating said projecting portion of said pin, wherein each of said pins is resiliently flexible for deflection away from an adjacent pin for providing a spacing between the enlarged head portions of adjacent pins wide enough to accept an elongated flexible object therethrough for routing of said object through the opening between two consecutive adjacent pins, and the body portion of said pins has a gradually decreasing cross section from the foot portion thereof to the head portion thereof.

14. The holder unit of claim 13 wherein the projecting portion of said pin is cemented in said aperture.

15. The holder unit of claim 13 wherein each of said apertures in said base member has a conical countersink disposed toward the upper surface of said base member for facilitating insertion of the tapered projecting portion of the foot portion of said pin.

16. The holder unit of claim 13 wherein the enlarged head portion of each pin engages the enlarged head portion of each adjacent pin.

17. The holder unit of claim 13 wherein each of said pins has a circular cross section.

18. The holder unit of claim 13 wherein each of said pins has a frusto-conical shape of constantly decreasing diameter from proximate the base member to proximate the enlarged head portion of said pin.

19. The holder unit of claim 13 wherein said interlocking means comprises a pair of integral tabs formed on at least an end of said base member, said tabs being so spaced and disposed as to be engageable in a recess in said base member for interconnecting a pair of said holder units disposed with their longitudinal axes at a right angle to each other.

20. The holder unit of claim 13 wherein mounting apertures are disposed through said base member for mounting upon a surface by means of fasteners.

21. The holder unit of claim 13 wherein an adhesive is disposed as a coating on the lower surface of said base member for mounting upon a surface.

22. The holder unit of claim 13 wherein a plurality of aligned pins are disposed in two parallel rows each proximate an edge of said base member.

23. The holder unit of claim 22 further comprising a removable cover having two pairs of substantially parallel edge walls, each of which comprises a wall along an edge of said cover and an intermediate wall disposed a predetermined distance away from the edge wall engaging diametrically opposite sides of the enlarged heads of the pins in a single row, the edge portion of at least one of said walls in each pair having a laterally projecting lip engaged below the enlarged head portion of the pins and interlocking said cover with said enlarged head portions.

24. The holder unit of claim 13 wherein said interlocking means comprises a tongue member projecting integrally beyond said base member and a one-way locking step disposed on the surface of said first tongue member, a second tongue member integrally formed proximate the other end of said base member and having a lower surface adapted to engage the upper surface of said first tongue member, and a portion formed proximate the end of said base member for interlocking engagement with the step of said first tongue member.

25. The holder unit of claim 24 wherein said first tongue is provided with a transverse weakening groove on the surface thereof for breaking away said first tongue substantially flush with the end of said base member.

26. The holder unit of claim 16 further comprising a corner modular unit abutting an end thereof, said corner unit comprising a square base member having a row of apertures disposed proximate each side thereof, a plurality of pins each lockably insertable in one of said apertures, and interlocking means at each side of said square base member for interlocking with said end of said holder unit.

* * * * *